United States Patent [19]

Adamek et al.

[11] 4,403,319

[45] Sep. 6, 1983

[54] DEVICE FOR CENTERING AND CLAMPING A FLEXIBLE FOIL

[75] Inventors: Manfred Adamek, Freusburg; Peter Schattmann, Siegen, both of Fed. Rep. of Germany

[73] Assignee: U.S. Philips Corporation, New York, N.Y.

[21] Appl. No.: 301,901

[22] Filed: Sep. 14, 1981

[30] Foreign Application Priority Data

Sep. 13, 1980 [DE] Fed. Rep. of Germany ....... 3034633

[51] Int. Cl.³ .......................... G11B 5/16; G11B 3/62
[52] U.S. Cl. .................... 369/261; 346/137; 360/86; 360/99; 369/270
[58] Field of Search ............. 369/261, 270, 271, 258; 360/86, 99; 346/137

[56] References Cited

U.S. PATENT DOCUMENTS 3,768,815 10/1973 Mathurin ............................. 369/261
3,968,972 7/1976 Morgan ............................... 369/261
3,972,535 8/1976 Bleiman ............................. 369/261

FOREIGN PATENT DOCUMENTS 2524316 1/1976 Fed. Rep. of Germany .
2927502 2/1980 Fed. Rep. of Germany ...... 369/261

Primary Examiner—Steven L. Stephan
Attorney, Agent, or Firm—Joseph P. Abate

[57] ABSTRACT

A centering and clamping device for a flexible foil includes an expanding cone which expands an expanding mandril via at least one resilient element, the force that can be transmitted to the expanding mandril by the resilient element at the location of the transition between the conical and the cylindrical portion of said mandril being greater than the force required for widening the opening in the foil but smaller than the force required for a substantial elastic deformation of the expanding mandril beyond the cylindrical inner bore of the hub, which bore terminates at an end surface. The expanding cone comprises a flange which urges the flange of the expanding mandril onto the foil.

6 Claims, 4 Drawing Figures

DEVICE FOR CENTERING AND CLAMPING A FLEXIBLE FOIL

BACKGROUND OF THE INVENTION

The invention relates to a device for centering and clamping a flexible foil with a round opening, for example, a round magnetic record carrier, on a bell-shaped hub which rotates the foil in the plane of its major surface, which hub has a cylindrical inner bore whose diameter is slightly greater than the diameter of the opening in the foil, and has an end surface on which the foil is positioned, the opening in the foil permitting the insertion of an expandable expanding mandril having a conical portion and a cylindrical portion into the inner bore of the hub, thereby keeping the foil positioned on the end surface of the hub with a flange having a contact surface which is parallel to said end surface. After the foil has been positioned on the end surface of the hub, an expanding cone, which can be inserted into the expands mandril, expanding the mandril so far that the cylindrical portion of the mandril is urged against the wall of the cylindrical inner bore of the hub, thereby enlarging the opening in the foil to the diameter of the inner bore.

Such a device is known from DE-AS No. 23 30 818. In said device, the expanding mandril has a conical inner surface. The generating angle of said conical inner surface is smaller than the generating angle of the circumferential surface of the expanding cone. When the expanding cone is inserted, the expanding mandril is therefore initially expanded until its cylindrical portion engages with the inner bore of the hub and the foil opening is enlarged to the diameter of said bore. As the expanding cone is inserted further, the expanding mandril is urged further into the inner bore of the hub so that the flange of the expanding mandril presses the foil onto the end surface of the hub.

In order to impart a torque to the foil, a specific minimum pressure of the flange of the expanding mandril is necessary, which, in the ideal case, should be directed parallel to the hub axis and which should at least be transmitted to the expanding mandril by the expanding cone. However, since the contact surface between the expanding mandril and the expanding cone is inclined relative to their axis, the transmission of force from the expanding cone to the expanding mandril also gives rise to a radial component which causes the expanding mandril to widen underneath the flange and depends on the inclination of the contact surface relative to the axis and the clamping force required for the foil. This radial force component gives rise to an additional expansion of the expanding mandril underneath the flange; the upper portion of the expanding mandril near the flange being tilted in an inward direction towards the axis owing to the necessarily rigid wall of the expanding mandril, thereby pulling the flexible foil inwards. This results both in centering errors and in uncontrolled bulging of the flexible foil. The centering error gives rise to an inaccurate position of the magnetic head relative to the desired track and thus to a substantial reduction of the read signal and the uncontrolled bulging of the flexible foil leads to at least a temporary loss of contact of the magnetic head with the foil.

SUMMARY OF THE INVENTION

It is an object of the invention to provide a device of the type mentioned in the opening paragraph, in which the expanding mandril, also after engagement with the inner bore, keeps the opening in the foil substantially registered with the cylindrical inner bore of the hub when the expanding cone is further inserted and the clamping force is applied, and in which, at the same time, the contact surface of the flange of the expanding mandril remains parallel to the end surface of the hub.

According to the invention this object is achieved in that the expanding cone expands the expanding mandril via at least one resilient element, the force that can be transmitted to the expanding mandril by the resilient element at the location of the transition between the conical portion and the cylindrical portion of said mandril being greater than the force required for widening the opening in the foil but smaller than the force required for a substantial elastic deformation of the expanding mandril beyond the cylindrical inner bore of the hub which bore terminates at the end surface, and that the expanding cone comprises a mandril flange which presses the flange of the expanding mandril onto the foil, thereby pressing said foil onto the end surface of the hub with a force which suffices to transmit the driving torque for the foil.

This has two effects. Firstly, the elastic element prevents the expanding cone from being deformed in an uncontrolled manner owing to dimensional tolerances secondly, the clamping force for the transmission of the torque from the hub to the foil, which force is substantially greater than the force necessary for widening, is transmitted directly to the flange of the expanding cone by the cone flange of the expanding mandril so that said mandril cannot be deformed in an uncontrolled manner as a result of the clamping force. This ensures that the centering of the foil remains accurate also after the application of the clamping force.

The resilient element may be constructed in various manners. In a first embodiment of the invention, the resilient element is an elastic ring disposed between the circumferential surface of the cone and the inner surface of the expanding mandril. Said elastic ring may be a rubber ring which may be arranged in a corresponding recess in the expanding cone or, preferably, in view of the well defined location where the force is applied, in a recess in the expanding mandril. Alternatively, the resilient element may be a round wire spring which bears against projections on the inner side of the expanding mandril and against projections of the expanding cone which are radially shifted relative thereto.

With respect to a different construction of the resilient element, a further embodiment of the invention is characterized in that there is provided a plurality of resilient elements in the form of leaf-shaped elements, and a leaf-shaped element is arranged in each segment of the expanding mandril, which is formed with axial slits, in such a way that all leaf-shaped elements constitute a cylinder or cone with the continuous axial slits within the expanding mandril. This results in a very good radial force transmission with very small axial components. Moreover, this embodiment is easy to manufacture if the leaf-spring-like elements are integral with the expanding mandril.

Widening of the opening in the foil gives rise to elastic deformation, as a result of which the foil bulges at least near the clamping device. In the device in accordance with the invention, said bulges are generally small in the case of normal tolerances. However, in special cases, said bulges may be more pronounced and may give rise to an undulate elastic deformation of the foil over a larger area. If, during rotation, this undulate deformation passes the magnetic read head, said head may temporarily lose contact with the foil so that the read signal is affected. In order to ensure that the foil is always as smooth as possible at the location of the read head, a further embodiment of the invention is characterized in that the end surface of the hub forms a conical surface having a generating angle which differs only slightly from 180°. This conical end surface ensures that, during widening, the foil bulges uniformly around the clamping device, while the outer area of the foil remains substantially smooth and rises only depending on the degree of widening, if the conical end surface opens in the upward direction. The inclination of the conical end surface relative to the clamped-in foil, that is relative to a plane perpendicular to the axis, needs only to be very small to ensure that even in the case of a greater degree of widening the foil bulges uniformly near the clamping device for which reason a further embodiment of the invention is characterized, with respect to the conical end surface of the hub, in that the generating angle is approximately 178°.

BRIEF DESCRIPTION OF THE DRAWING

Embodiments of the invention will be described in more detail with reference to the drawing. In the drawing.

DESCRIPTION OF THE PREFERRED EMBODIMENTS

Figure 1:
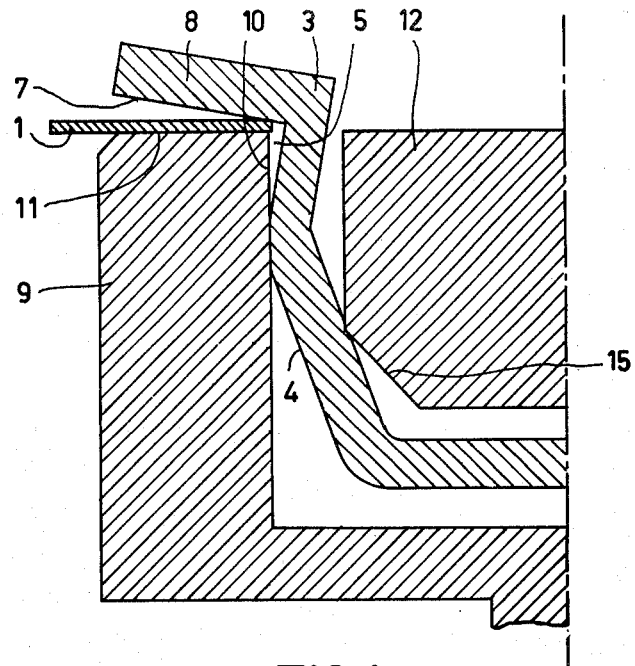
FIG. 1 illustrates the deformation of a prior-art expanding mandril when the expanding cone has been inserted completely.

FIG. 1 schematically represents one-half, that is up to the central axis, of a prior-art clamping device. The hub 9, which is driven and which serves to transmit a torque to the foil 1, has a cylindrical inner bore and a plane end surface 11 on which the foil is positioned. The expanding mandril 3 which, in case of the said DE-AS 23 30 818 is, formed with axial slits to facilitate expansion, comprises a flange 8, a cylindrical portion 5 and a conical portion 4. The inner side of the expanding mandril is also partly conical owing to the uniform wall thickness, an expanding cone 12 being inserted into this portion, thereby expanding the expanding mandril 3. As the expanding cone 12 is further inserted, the expanding mandril 3 is pressed further into the inner bore of the hub 9 so that the underside 7 of the flange 8 presses the foil onto the end surface 11 of the hub 9. When the expanding cone 12 is inserted, not only an axial force is exerted on the wall of the expanding mandril 3, but also a radial force-component which urges the wall of the expanding mandril 3 outwards near the conical area 4 and pulls the flange 8 of the expanding mandril 3 inwards by a lever action; the fulcrum of the lever being constituted by the transition between the cylindrical portion 5 and the conical portion 4 of the expanding mandril 3, which transition engages with the inner surface 10 of the inner bore of the hub 9. As a result of this, the foil 1 is also pulled inwards because the coefficient of friction between the foil 1 and the flange 8 is greater than that between the foil and the hub 9. Moreover, the flange 8 is tilted upwards near its circumference so that the contact surface 7 of the flange 8 no longer engages completely with the foil. This situation is shown greatly exaggerated in FIG. 1, but the misalignments, although they are very small, still give rise to perceptible eccentricities during operation and even stronger uncontrolled bulging of the foil. The eccentricities and bulging lead to an unsatisfactory contact of the magnetic head with the foil surface and to a departure of the magnetic head from the desired track on the foil, which may give rise to substantial variations of the read signal supplied by the magnetic head.

Said undesired displacement of the flange 8 cannot be avoided by transferring the point of engagement of the expanding cone 12 with the expanding mandril 3 to a location opposite the cylindrical portion 5, because the flange 8 is already tilted up off the rim of inner bore and the end surface 11, as is schematically represented in FIG. 1, by an axial pressure on the expanding mandril 3, whose magnitude, for example, depends on tolerances. Thus, a satisfactory clamping of the foil 1, which should take place over the greater part of the end surface 11, is no longer guaranteed and uncontrolled bulges are produced in the foil.

Figure 2:
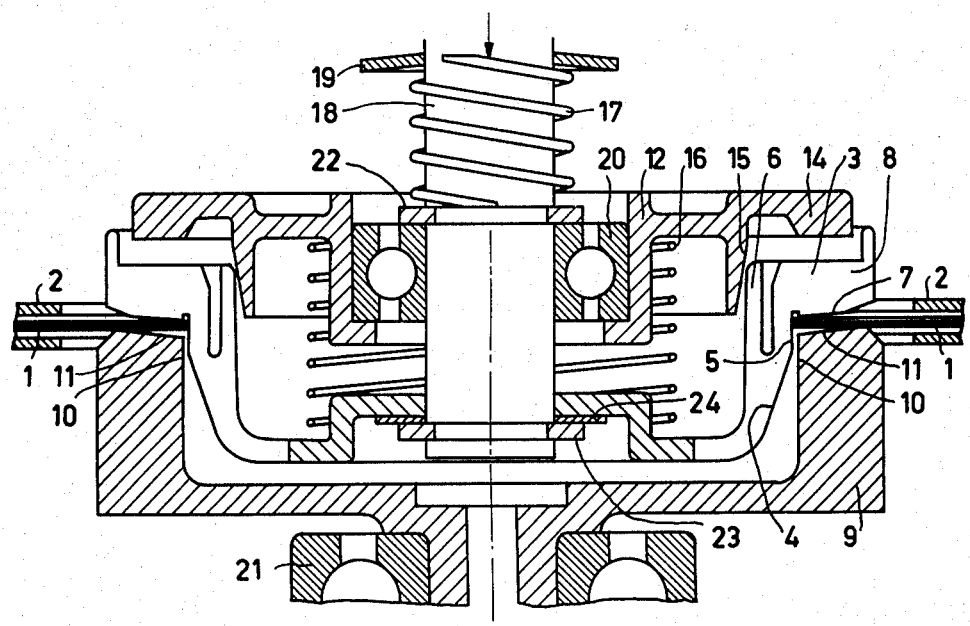
FIGS. 2 and 3 are two cross-sectional views of a device with a conical end surface in accordance with the invention in the case of a partly and completely inserted expanding cone.

In the device in accordance with the invention shown in FIG. 2, the expanding mandril 3 has already been inserted through the opening in the foil 1 into the inner bore of the hub 9, while the conical circumferential surface 15 of the expanding cone 12 is just not in contact with the expanding mandril 3 and thus has not yet expanded said mandril. The edge portion of the foil around the opening in the foil 1 thus projects beyond the edge of the wall 10 of the inner bore of the hub 9, and the cylindrical portion 5 of the expanding mandril 3 does not yet engage with said wall. Furthermore, the end surface 11 of the hub 9 is not plane but constitutes a conical surface which opens towards the top; the lower surface 7 of the flange 8 of the expanding mandril 3 constitutes an exactly corresponding conical surface.

The hub 9 is driven from below via a shaft which is journalled in the ball-bearing 21. The expanding mandril 3 is rotatable and axially movable on a shaft 18 and is retained on said shaft by means of a washer 24 and a retaining ring 23. The expanding cone 12 is mounted on the shaft 18 by means of a ball-bearing 20; an axial force indicated by the arrow at the top and exerted on the spring 17 via the washer 19 being imparted to the expanding cone 12 via the ring 22 and the ball-bearing 20. Between the expanding mandril 3 and the expanding cone 12, a comparatively lax spring 16 is arranged. The spring 16 facilitates the circumferential surface 15 of the expanding cone 12 slipping out of the expanding mandril 3.

The expanding mandril 3 is provided with leaf spring shaped projections 6 which are attached to the expanding mandril at the location of the transition between the cylindrical portion 5 and the conical portion 4 of said mandril. They may also be arranged slightly higher but always below the plane of the foil.

If, starting from the position shown in FIG. 2, the expanding cone 12 is pressed further into the expanding mandril 3, the projections 6 are urged outward and thereby press the individual segments of the expanding mandril, which is formed with axial slits, so far apart that said mandril and thus the opening in the foil 1 are expanded. The flange 8 of the expanding mandril 3 is pressed gently onto the foil with the surface 7 and positions said foil on the end surface 11 of the hub 9 by means of a small force produced by the friction between the conical surface 15 and the projections 6.

When the cylindrical portion 5 of the expanding mandril 3 engages with the wall 10 of the inner bore, further expansion is not possible. Thus, as the expanding cone 12 is inserted further, the projections 6 are merely subjected to a stronger elastic deformation so that the force with which said cylindrical portion 5 of the expanding mandril 3 is pressed against the wall 10 increases only slightly and allows no elastic deformation by which the parts of the expanding mandril 3 can be pressed onto the end surface 11 via the edge of the hub 9, thereby expanding the foil in an undefined manner. The edge portion of the foil, near the opening in the foil 1 remains more accurately in register with the wall 10 of the hub 9.

Figure 3:
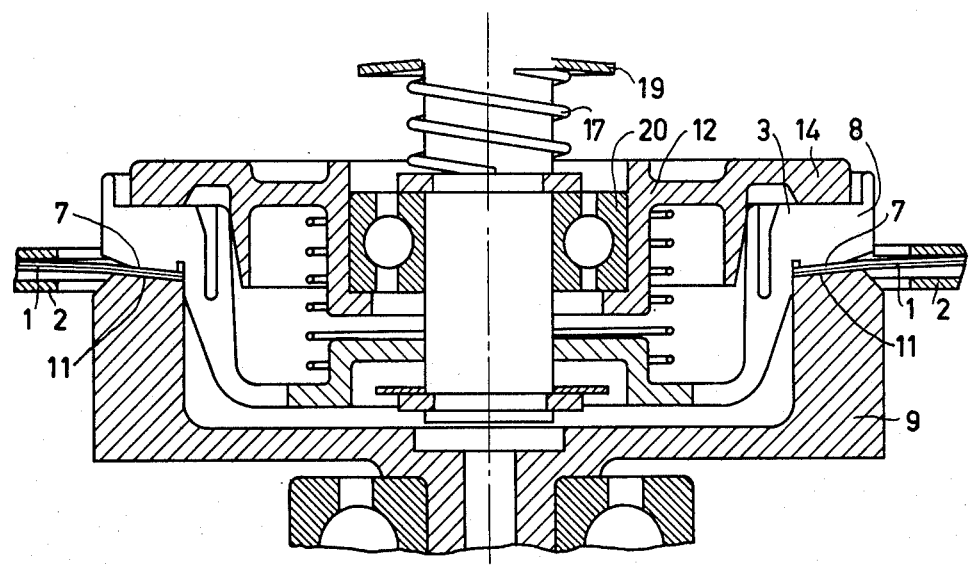

If the expanding cone 12 is then pressed further inward, the situation represented in FIG. 3 is obtained. The cone flange 14 of the expanding cone 12 is then positioned on the flange 8 of the expanding mandril 3 and transmits substantially the entire force to said mandril, which force acts on the washer 19 and, via the spring 17 and the ball-bearing 20, on the expanding cone 12. The lower surface 7 of the flange 8 presses the foil 1 onto the end surface 11 of the hub 9 with the same force, without any parts of the expanding mandril 3 being bent or being subject to shearing. Consequently, no deformation occurs so that the underside 7 of the flange 8 practically always presses the foil 1 onto the end surface 11 with its entire surface area. Said force should be sufficient to transmit the torque necessary to rotate the foil 1. It should then be taken into account that the foil is disposed in an enclosure 2, rubs against the inner wall of said enclosure, and is thereby braked. On the other hand, it is possible, without any problems such as any uncontrolled deformations, to increase substantially the force transmitted to the foil 1 by the cone flange 14 via the flange 8 in order to ensure that in exceptional cases heavier foils which are freely movable in their enclosures are driven correctly.

Owing to the conical end surface 11 and underside 7 of the flange 8, the foil does not lie flat but is tilted slightly upwards starting at the location of clamping. As a result of this, the stress imparted to the foil by widening the opening in the foil is compensated for uniformly and in a well-defined manner while, depending on the degree of widening, the bulged portion and thus the transition to the flat part of the foil is situated further outward. In the case of a generating angle of approximately 178° of the conical surface, that is, at an inclination of the end surface 11 of approximately 1° relative to the plane surface, bulging will be restricted to an area between the location of clamping and the area which is normally covered by the magnetic head, so that, in this area, the foil 1 is always flat and without undulations and can thus be scanned correctly by the magnetic head. In addition, centering of the foil is guaranteed for substantially all tolerances. In the case of a foil with a minimum diameter of the opening and a hub with a maximum diameter of the inner bore, which case would give rise to an extreme widening of the opening in the foil, the flat outer part of the foil 1 will be lifted to an extent which is only slightly greater than in the case of opposite tolerances.

Figure 4:
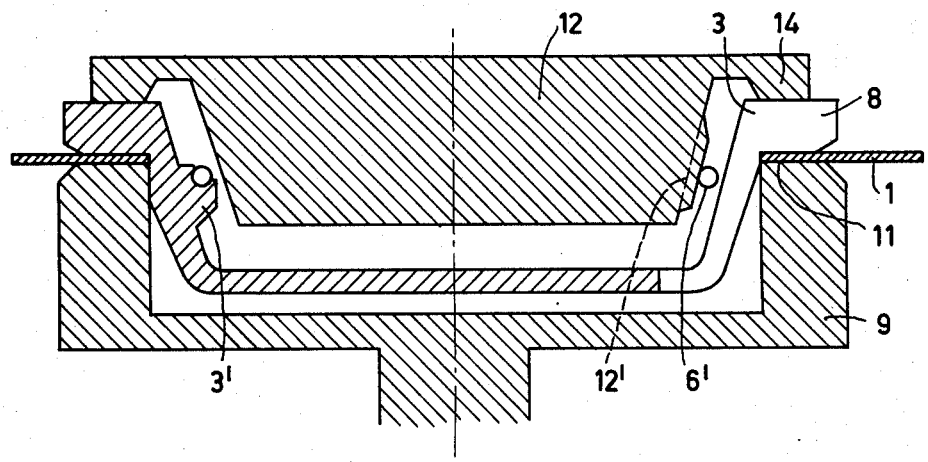
FIG. 4 shows a different construction of the resilient element.

In the embodiment described above, the resilient element is constituted by a plurality of leaf spring like projections of the expanding mandril, which prosections are integral with the expanding mandril and thus can readily be manufactured from a plastics which results in simple mounting of the elements. FIG. 4 shows a different construction of the resilient element, which is constituted by a wire spring 6' which is positioned on projections 3' of the expanding mandril which is formed with an odd number of axial slits. The expanding cone 12 also comprises projections 12' which are shifted relative to the projections 3' on the expanding mandril 3. As a result of this, the wire spring 6' can be deflected between the projections 3' substantially up to the inner wall of the expanding cone without any uncontrolled radial forces being produced.

The ring 6' may alternatively be a rubber ring, the projection 3' of the expanding mandril extending over the full circumference, but being slightly smaller, so that the ring is clear of the inner side. The expanding cone 12 then need not be provided with projections.

All the constructions of the resilient element have in common that the element is capable of taking up different dimensional tolerances and also any dimensional changes owing to thermal expansion, while the force which acts on the expanding mandril 3 in the radial direction is small in each case. Also, the force for the transmission of the torque from the end surface 11 of the hub 9 to the foil 1 is applied directly by the expanding cone 12 via a flange 14 in a direction which is substantially perpendicular to the end surface 11. Thus, undesired deformations of the expanding mandril 3 are eliminated.

What is claimed is:

1. A device for centering and clamping a flexible foil having a round opening, comprising a bell-shaped hub which rotates the foil in the plane of its major surface, which hub has a cylindrical inner bore whose diameter is slightly greater than the diameter of the opening in the foil, and also has an end surface on which the foil is positioned, the opening in the foil permitting the insertion of an expanding mandril having a conical surface and a cylindrical portion insertable into the inner bore of the hub, thereby keeping the foil positioned on the end surface of the hub with a flange having a contact surface which is parallel to said end surface, and after the device further comprising an expanding cone, which can be inserted into the expanding mandril, for expanding the expanding mandril so far that the cylindrical portion of the expanding mandril is urged against the wall of the cylindrical inner bore of the hub, thereby enlarging the opening in the foil to the diameter of the inner bore, characterized in that the expanding cone (12) expands the expanding mandril (3) via at least one resilient element (6), the force that can be transmitted to the expanding mandril (3) by the resilient element (6) at the location of the transition between the conical (4) and cylindrical portion (5) of said mandril being greater than the force required for widening the opening in the foil (1) but smaller than the force necessary for a substantial elastic deformation of the expanding mandril (3) beyond the cylindrical inner bore of the hub (9), which bore terminates at the end surface (11), and that the expanding cone (12) comprises a cone flange (14) which presses the flange of the expanding mandril (3) onto the foil (1), thereby pressing said foil onto the end surface (11) of the hub (9) with a force which suffices to transmit the driving torque for the foil.

2. A device as claimed in claim 1, characterized in that the resilient element (6) is an elastic ring disposed between the circumferential surface (15) of the expanding cone (12) and the inner surface of the expanding mandril (3).

3. A device as claimed in claim 1, characterized in that there is provided a plurality of resilient elements (6) in the form of leaf-shaped elements, and a leaf-shaped element (6) is arranged in each segment of the expanding mandril (3), which mandril is formed with axial slits (26) in such a way that all the leaf-shaped elements (6) constitute a cylinder or cone with continuous axial slits within the expanding mandril (3).

4. A device as claimed in claim 3, characterized in that the leaf-shaped elements (6) are integral with the expanding mandril (3).

5. A device as claimed in claim 1, characterized in that the end surface (11) of the hub (9) forms a concical surface having a generating angle which differs only slightly from 180°.

6. A device as claimed in claim 5, characterized in that the generating angle is approximately 178°.

* * * * *

UNITED STATES PATENT AND TRADEMARK OFFICE
CERTIFICATE OF CORRECTION

PATENT NO. : 4,403,319

DATED : September 6, 1983

INVENTOR(S) : Manfred ADAMEK, Peter SCHATTMANN

It is certified that error appears in the above-identified patent and that said Letters Patent is hereby corrected as shown below:

Col. 6, CLAIM 1, line 12, delete "after"

Signed and Sealed this

Twelfth Day of March 1985

[SEAL]

Attest:

DONALD J. QUIGG

*Attesting Officer*     *Acting Commissioner of Patents and Trademarks*